United States Patent [19]

Charchanko et al.

[11] Patent Number: 4,593,159
[45] Date of Patent: Jun. 3, 1986

[54] BASE PLATE FOR TELEPHONE SET BASE

[75] Inventors: Eugene W. Charchanko, Thorndale; Gerd Kuhfus; Algirdas J. Dragunevicius, both of London, all of Canada

[73] Assignee: Northern Telecom Limited, Montreal, Canada

[21] Appl. No.: 669,840

[22] Filed: Nov. 9, 1984

[51] Int. Cl.⁴ .............................................. H04M 1/02
[52] U.S. Cl. ............................. 179/100 R; 179/100 C
[58] Field of Search ........... 179/100 R, 100 C, 100 D, 179/179, 178, 146 R, 159, 160, 161, 162, 163, 164, 165, 166

[56] References Cited

U.S. PATENT DOCUMENTS

| | | | |
|---|---|---|---|
| 3,515,816 | 6/1970 | Laing | 179/178 X |
| 3,657,487 | 4/1972 | Schwanck et al. | 179/100 R |
| 4,284,855 | 8/1981 | Adams et al. | 179/100 C |
| 4,292,477 | 9/1981 | Adams et al. | 179/100 C |
| 4,491,695 | 1/1985 | Haskins | 179/100 D |

FOREIGN PATENT DOCUMENTS

| | | | |
|---|---|---|---|
| 1066623 | 10/1959 | Fed. Rep. of Germany | 179/179 |
| 2536437 | 9/1976 | Fed. Rep. of Germany | 179/178 |

OTHER PUBLICATIONS

"The Development of the Ambassador Range of Telephones and Production of the Basic Instrument", D. A. Pitchard et al., The Post Office Electrical Engineers Journal, POEEJ, vol. 74, Jul. 1981, pp. 70–80.

Primary Examiner—Gene Z. Rubinson
Assistant Examiner—R. Vaas
Attorney, Agent, or Firm—Sidney T. Jelly

[57] ABSTRACT

A base-plate for a telephone set base has a bottom web or panel, with a wall extending upward around the panel for the majority of its periphery. At one side an inclined web extends inward and upward and a wall extends round the periphery of the web, with an aperture formed in the bottom panel coincident with the inclined web. The inclined web, and the wall around the web define a lower recess and an upper recess. A further recess in the bottom panel, closed on three sides and top and open on the fourth side provides access for modular plugs of the handset cord and line cord. Enclosed channels extend from the upper end and lower end to the further channel for passage of line and handset cords. A further enclosed channel extends from the lower recess to the channel from the upper end for alternate positioning of a short line cord in a wall mounting mode. Mounting means for a circuit board, hook switch and piezoceramic transducer are provided.

6 Claims, 7 Drawing Figures

BASE PLATE FOR TELEPHONE SET BASE

This invention relates to a base-plate for a telephone set base.

To reduce the costs of telephones, they are becoming smaller, particularly in respect of their thickness or height. Also, many of the components of earlier telephones have been replaced by smaller, lighter, and less expensive components. An example is the gong or bell which has been replaced by different audio generators and this has also obviated the transformer for the gong. Other parts have been replaced by integrated circuits and much of the circuitry is now mounted on a circuit board. Conveniently the dial, now generally a pushbutton dial, is also mounted on the circuit board. As a further cost reduction, it is desirable that the telephone set be capable of desk or wall mounting at will, without any complex changes or use of additional parts. This is particularly necessary now that users are likely to own their telephone sets.

When desk mounted, it is useful to be able to pick up and carry the telephone set in one hand. It is desirable, with the use of a circuit board carrying the dial and circuitry, that the connection of the line cord and the handset cord be made direct to the circuit board, in either wall or desk mounting, with the jacks mounted on the circuit board and the line and handset cords having plugs for insertion in the jacks. Alternate cord paths for the line cord, for wall and desk mounting allows the use of alternate line cords.

The base-plate of the present invention provides for mounting of a circuit board, access to modular jacks on the circuit board through the base plate, with alternate paths for the line cord and a path for the handset cord. Provision is made for a holding position, in cooperation with a top housing, and also to provide a recess for positioning over a wall outlet when wall mounted. Alternate wall mounting centers are provided. At the same time, the interior of the telephone set is protected as access to the interior is substantially prevented by the base plate, the various features such as inserting the plugs and routing the line and handset cords being carried out on the exterior of the base plate.

The invention will be readily understood from the following description, in conjunction with the accompanying drawings, in which.

Figure 1:
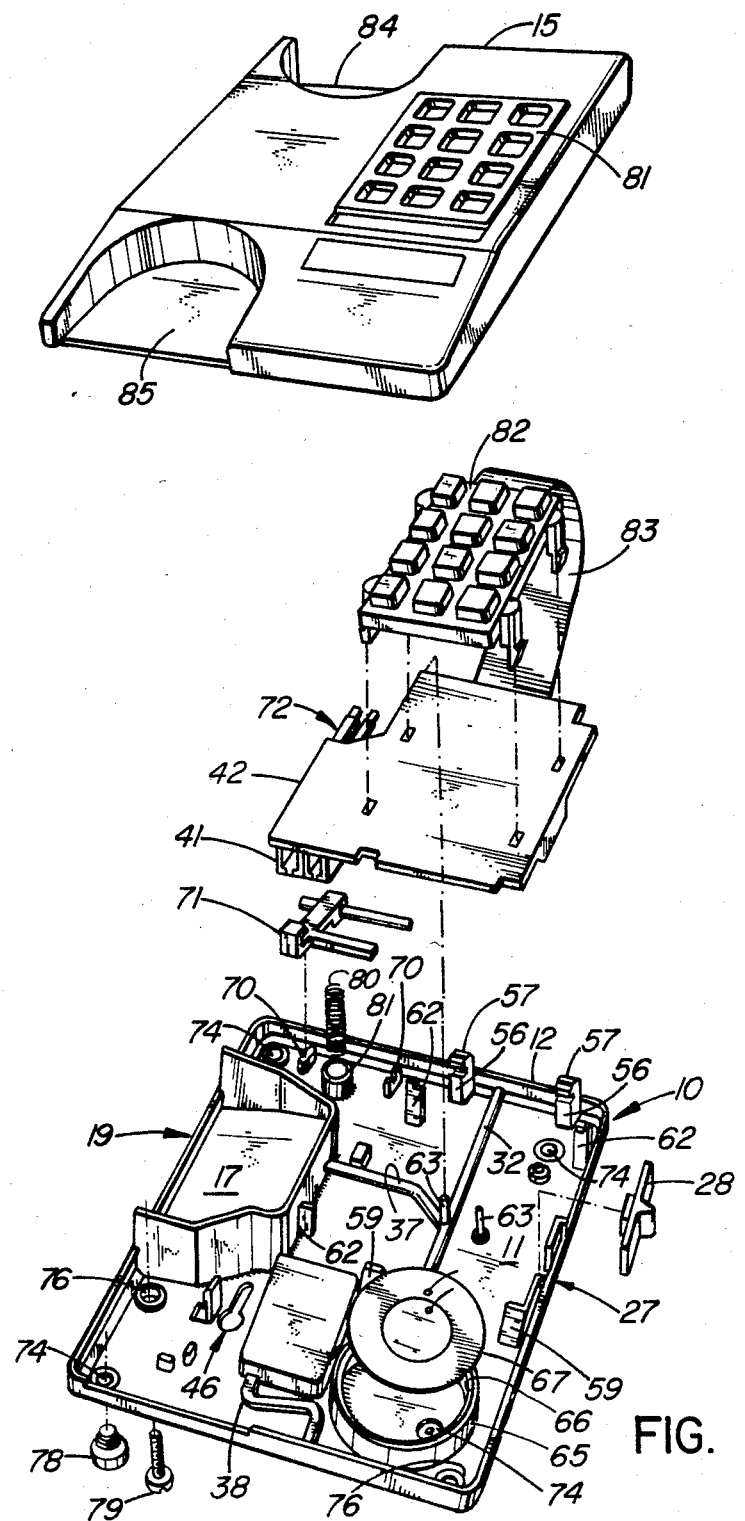
FIG. 1 is an exploded perspective view of a telephone set particularly illustrating the base plate.
Figure 6:
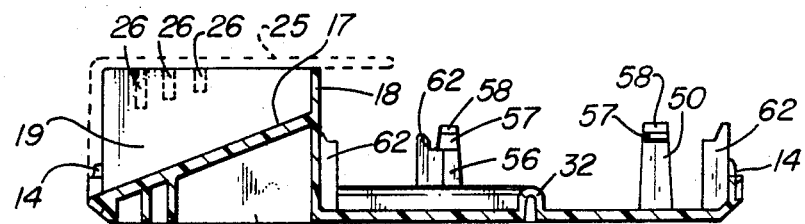
FIG. 6 is a cross-section on the line VI—VI of FIG. 2.

As particularly seen in the Figures, a base plate 10 has a flat bottom panel 11 with a peripherally extending wall 12. On the top surface 13 of the wall there is an upwardly extending rib 14, which cooperates with a further rib on a wall of a top housing 15, FIG. 1. The rib 14 is interrupted at back and front of the base plate, at 16, where recesses are provided in the top housing for reception of receiver and transmitter housings of a handset. Also, at one side, the left hand side when viewed from the top, the wall 12 is interrupted by an inwardly and upwardly extending web 17 having a wall 18. The upper surface of web 17, and wall 18 cooperate with the top housing to form a recess 19 into which fingers can be inserted for carrying the telephone set. The web 17 also defines a recess 20 in the bottom surface of the base plate to provide clearance for wall mounting of the telephone set on a wall outlet. This is also seen in FIG. 6. In FIG. 6, top housing 15 is also illustrated. The top housing can have ribs, indicated at 26, extending down into the recess 19 to assist in gripping the telephone set. A further interruption in the rib 14 is at the side opposite to the recesses 19 and 20, at 27, for mounting of a volume control 28 (FIG. 1).

Figure 7:
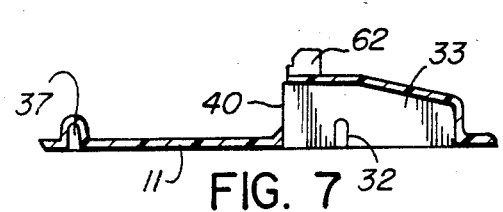
FIG. 7 is a cross-section on the line VII—VII of FIG. 2.

Formed in the bottom surface of the panel 11 are enclosed channels for reception of telephone cords. Effectively the channels extend like tunnels. Considering particularly FIG. 3, the top or back end is at 30, the front end being at 31. A first channel 32 extends from the top edge 30 down for a major part of the length of the base plate, entering a small recess 33 in the bottom panel 11. The recess extends upward and is enclosed on three sides and on the top, being open at its top end 40. This is seen in FIG. 7. The open end provides plug-in access to two modular jacks 41 mounted on a circuit board 42 the jacks indicated in dotted outline at 41 in FIG. 7. At spaced apart positions along the channel 32 bends are formed by arcuate recesses 34 in one wall of the channel and ribs 35 extending from the other wall. These retain a cord in the channel. While in most positions the ribs 35 extend the full depth of the channel, at two positions 36 near the top end the ribs only extend into the channel for a short distance. This enables the cord to be pushed past the rib and then to extend behind it. This provides a high degree of retention of the cord where it exits from the base plate.

A second channel 37 extends from one side of the recess 20 to the channel 32. This channel, 37, has bend positions as in channel 32. A third channel 38 extends from the bottom of recess 33 to the bottom edge 31. In addition to having bends formed therein, with one position 39 having a rib 35 extending only part way into the channel, the channel 38 is made somewhat sinuous.

In use, depending upon the mounting position, a line cord will be positioned in channel 32, or in channel 34 and the part of channel 32 extending from its junction with channel 37 to the recess 33. This is dependent on desk or wall mounting. In desk mounting the line cord extends through channel 32 and then to an outlet at some convenient place. For wall mounting, a line cord extends from recess 33 along the first part of channel 32, then into channel 37, finally plugging into a wall outlet. The jack is positioned in the recess 20. The handset cord extends from recess 33 along channel 38 exiting from the bottom edge 31 and being connected to a handset. In the recess 33 both line cord and handset cord have modular plugs which insert into modular jacks.

Figure 2:
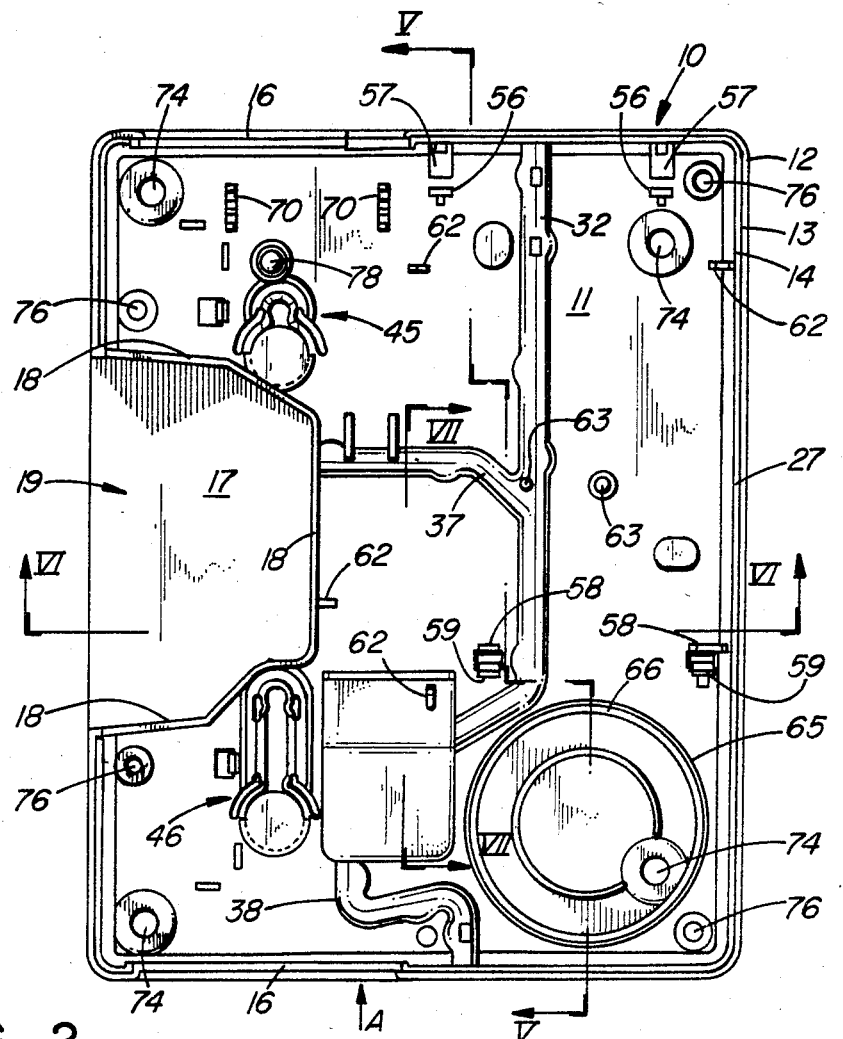
FIGS. 2 and 3 are top and bottom plan views respectively of the base plate in FIG. 1.
Figure 4:
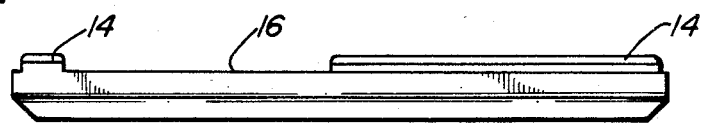
FIG. 4 is an end view in the direction of arrow A in FIG. 2.
Figure 3:
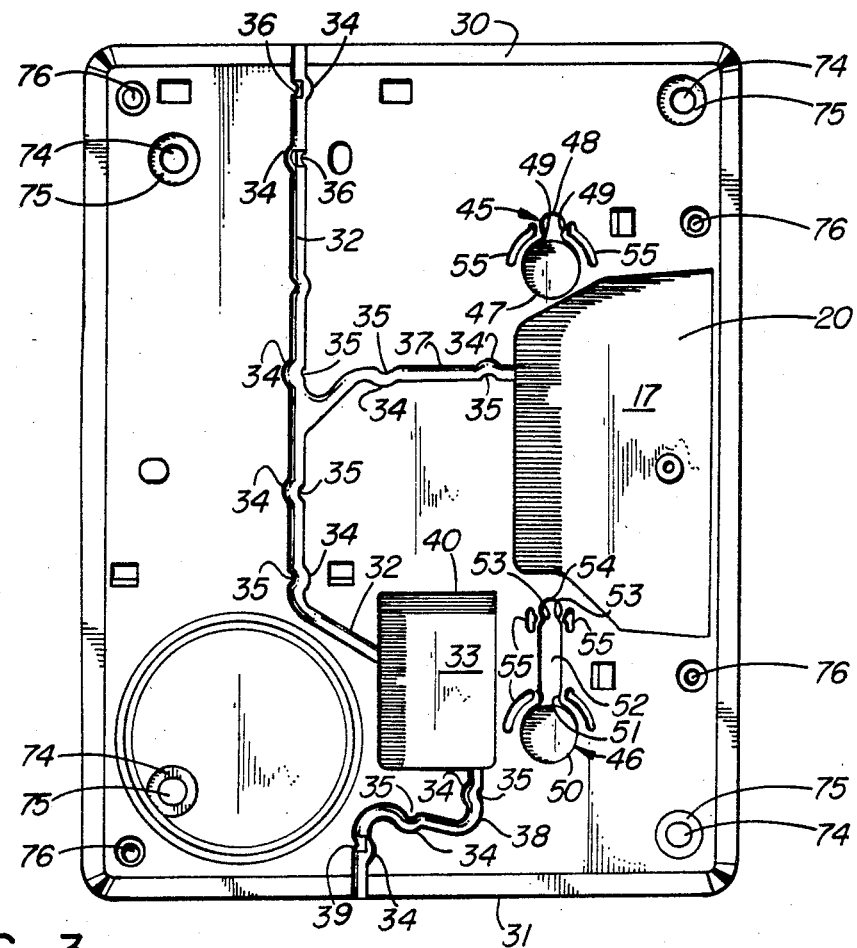

The covered tops of the channels are seen in FIGS. 1 and 2, the channels identified by the same reference numerals as in FIG. 3.

Also provided in the bottom panel 11 are two "keyhole" apertures 45 and 46. One aperture, 45, is of simple form having a large diameter portion 47 and a small diameter portion 48 separated by a neck portion 49. For wall mounting, the head of a screw or stud in a wall mount fitting is first positioned in the large diameter portion 47 and then the telephone set moved down, the shank of the screw or stud snapping through the neck portion 49 into the small diameter portion 48. The other aperture, 46, has a large diameter portion 50, then a neck portion 51, followed by a slot portion 52 which ends in a further neck portion 53 followed by a small diameter portion 54. Depending upon the pitch of the screws or studs in the wall mount, the stud portion of the screw or stud positioned in aperture 46 will either finish up in the small diameter portion 54 or at the lower end of slot portion 52, as there are two pitch dimensions in use. Slots 55 provide flexibility at the neck portion.

Figure 5:
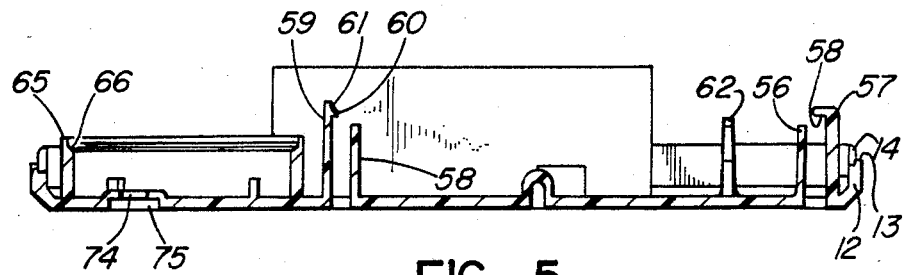
FIG. 5 is a cross-section on the line V—V of FIG. 2.

Support positioning and retaining members are also provided, for mounting circuit board 42 on the base plate. These are particularly seen in FIGS. 1 and 2 and FIG. 5. Adjacent to the top edge 30, on either side of channel 32, are two support members 56 and two positioning and retaining members 57. Members 57 are immediately adjacent the wall 12 while the support members 56 are positioned inward of members 57. A support member 56 and a retaining and positioning member 57 form a pair. The top of each positioning and retaining member 57 has a forward projecting rib 58. When a circuit board is in position it rests on a support member with its edge against the positioning and retaining member, with the rib 58 extending over the edge of the circuit board.

Two further pairs of support members 58 and positioning and retaining members 59 are provided towards the end 31. There is a slight difference in that a rib 60 is formed with an upper inclined or chamfered edge 61 on the top of member 59. In mounting a circuit board its top end is pushed under the ribs 58 on the members 57 and then the board is pushed down, the members 59 flexing for the board to slide down and snap under the ribs 60. Some flexing of the members 57 can also occur. Additional support and locating members are provided, at 62, and two support members at 63.

Adjacent to the end 31 and positioned adjacent to one side wall, the right hand side as seen in FIG. 2, is a mounting position for a transducer. The mounting comprises an annular wall 65 extending up from the bottom panel 11 and having an annular ledge 66 on the inner circumference of the wall. In the example a piezoceramic disc transducer 67 (FIG. 1) is mounted in the annular ledge, to act as a ringer.

Adjacent to the top end 30, and generally aligned with the interruption in the rib 14 at 15, are two snap-in supports 70 for rotatably holding a hook switch actuator 71. The actuator pivots about an axis through the supports 70 to actuate a switch on the circuit board, seen at 72 in FIG. 1.

At positions near each corner are holes 74 through the bottom panel in which are mounted plastic feet. The feet rest in and project from recesses 75, around the holes 74, in the bottom surface of the bottom panel 11. The feet have stems which project through the holes 71 and are deformed over on the top surface of the panel. Also provided are holes 76 through which screws can pass and screw into hollow bosses in the top housing to hold the top housing and the base plate together.

Feet 78 and screws 79, which pass through the holes 74 and 76 respectively, are shown in FIG. 1. Also shown in FIG. 1 is a compression spring 80 which is located at one end in a recess 87 formed on the base plate and acts to bias the actuator 71 upwards. Also in FIG. 1 is illustrated the pushbutton dial 82 which snaps on to the circuit board 42, being connected with the circuit on the circuit board by a flexible flat cable 83.

The pushbuttons of the dial extend up through a bezel formation 81 in the top housing 15. The recesses for the handset are shown at 84 and 85.

What is claimed is:

1. A base-plate for a telephone set base, comprising:
   a flat rectangular bottom panel;
   a peripheral wall extending upwardly from the bottom panel and extending for at least a major part of the periphery of the bottom panel;
   an inclined web extending laterally inward from one side edge of the bottom panel, the web extending inwardly and upwardly;
   an aperture in the bottom panel aligned with said inclined web;
   a wall extending up from said bottom panel around said aperture, said wall extending upward past said inclined web and having an upper edge for cooperation with a top housing of a telephone set base;
   said wall extending up from said bottom panel, and said inclined web, defining a lower recess below said inclined web and an upper recess above said inclined web, said upper recess open at said one side edge of said bottom panel;
   a further recess extending up through said bottom panel, said further recess bounded on three sides by a continuous wall and closed at a top by a transverse web, said further recess open on a fourth side;
   a first enclosed channel in said bottom panel extending from a back end of said bottom panel to said further recess;
   a second enclosed channel in said bottom panel extending from a front end of said bottom panel to said further recess;
   a third enclosed channel in said bottom panel extending from said lower recess to said first enclosed channel;
   support and positioning members extending up from said bottom panel to support and position a circuit board; and
   retaining members extending up from said bottom panel for retaining said circuit board in position, said retaining members including at least one deflectable member, said deflectable member deflecting to admit passage of an edge of a circuit board and snapping back over said circuit board.

2. A base-plate as claimed in claim 1, including means for pivotally supporting a hook switch on said bottom panel adjacent to said back end and to said one side edge.

3. A base-plate as claimed in claim 1, including an annular wall extending up from said bottom panel, and an annular ledge on an inside surface of said annular wall for mounting of a piezoceramic transducer.

4. A base-plate as claimed in claim 1, including keyhole slots in said bottom panel for wall mounting of said telephone set base.

5. A base-plate as claimed in claim 1, said enclosed channels extending up from an upper surface of said bottom panel and including bends at spaced apart positions for assistance in retaining telephone cords in the channels.

6. A base-plate as claimed in claim 1 said upper recess forming a finger access when said base-plate is connected to said top housing.

* * * * *